US006935827B2

(12) United States Patent
Delaurier

(10) Patent No.: US 6,935,827 B2
(45) Date of Patent: Aug. 30, 2005

(54) ROUND BALE TRAILER

(75) Inventor: Ronald T. Delaurier, Laurier (CA)

(73) Assignee: Fourgault Industries Ltd., St. Brieux (CA)

( * ) Notice: Subject to any disclaimer, the term of this patent is extended or adjusted under 35 U.S.C. 154(b) by 28 days.

(21) Appl. No.: 10/662,212

(22) Filed: Sep. 12, 2003

(65) Prior Publication Data

US 2004/0062626 A1 Apr. 1, 2004

Related U.S. Application Data

(63) Continuation-in-part of application No. 10/180,722, filed on Jun. 26, 2002, and a continuation-in-part of application No. 09/927,443, filed on Aug. 13, 2001, now abandoned.

(51) Int. Cl.$^{7}$ .................................................... B60P 1/48

(52) U.S. Cl. ...................... 414/24.5; 414/111; 414/551; 414/552

(58) Field of Search ............................... 414/24.5, 24.6, 414/111, 551, 552, 554

(56) References Cited

U.S. PATENT DOCUMENTS 3,942,666 A 3/1976 Pfremmer
4,076,138 A 2/1978 Honomichl
5,180,271 A 1/1993 Farden
5,320,477 A 6/1994 Druse
5,340,259 A * 8/1994 Flaskey ..................... 414/24.5

FOREIGN PATENT DOCUMENTS

CA 2300006 9/2001

* cited by examiner

*Primary Examiner*—Janice L. Krizek
(74) *Attorney, Agent, or Firm*—Patterson, Thuente, Skaar & Christensen, P.; Michael A. Bondi

(57) ABSTRACT

A trailer for transporting cylindrical bales comprises a pair of rails and a conveyor chain located between and below the rails such that a bale is maintained in position on the conveyor chain by the rails. The load engaging face of the conveyor chain comprises a plurality of resilient pads having a roughened surface to increase friction between the pads and the bale without protruding into the bale. The load engaging face can slide with respect to the bale. First and second loading arms are operative to raise first and second bales onto corresponding conveyors. A third loading arm raises the first bale from the first conveyor to allow the first loading arm to raise a third bale from the ground and position it on the first conveyor, and then lowers the first bale to rest on the second and third bales.

20 Claims, 8 Drawing Sheets

ROUND BALE TRAILER

This is a Continuation-in-Part of Application Ser. No. 10/180,722, filed Jun. 26, 2002 and Ser. No. 09/927,443 filed Aug. 13, 2001, now abandoned.

This invention is in the field of towed vehicles for loading, transporting, and unloading large cylindrical bales, and conveyors therefore.

BACKGROUND

Various designs of transport vehicles for large cylindrical bales, commonly known as "round bales", have been provided previously. In one arrangement, as disclosed in U.S. Pat. No. 3,942,666 to Pfremmer, a trailer carries two parallel rows of round bales. The bales are engaged by a lifting apparatus at a front end of a trailer and flipped rearwards onto the trailer. The bales land on a single longitudinal conveyor chain and are maintained in a position substantially centered on the conveyor chain by a confining wall on each side. The conveyor chain has lugs extending upward from the chain that extend into the bale and grab the bale to move it rearward with the conveyor chain to accept another bale at the front end. Bales are loaded on the front end and moved successively rearward by the lugs on the conveyor chain until the trailer is filled. The trailer of Pfremmer is difficult to use because the bales have to be positioned in front of the trailer.

Another arrangement, shown in U.S. Pat. No. 4,076,138 to Honomichl, Sr. more conveniently loads bales from the side, which can be more convenient than the above mentioned arrangement, but only allows a single row of bales to be loaded onto a trailer. Similar to the trailer of Pfremmer, the bales land on a single longitudinal conveyor chain and are maintained in a position on the conveyor chain by a cradle comprising a raised rail on each side. The conveyor chain carries hooks or pins, similar to the lugs of Pfremmer extending outwardly to engage the bales so they will slide on the rails with the conveyor chain.

Some examples of arrangements having three rows of bales are shown in U.S. Pat. No. 5,180,271 to Farden, and U.S. Pat. No. 5,320,477 to Druse, Sr. These arrangements do not have a convenient loading arrangement on the trailer. The bales are simply loaded onto the trailer by a tractor or the like which has to drive beside the trailer loading the bales thereon. The arrangements may not be convenient in that the bales have to be precisely positioned onto the trailer in order for the trailer to properly carry the bales.

The lugs, hooks, pins, or the like on the conveyor chains used in the above arrangements of Pfremmer and Honomichl, Sr. can damage the strings tying the bale when the bale is dropped on the conveyor chain during loading, and also puncture the covering on plastic wrapped bales. Also the protruding devices can rip the strings tying the bale if the conveyor chain is not stopped when the bales are obstructed as sometimes happens. For these reasons it is common to use a pair of conveyor chains moving in unison under each row of bales. The side-by side conveyors act as the cradle, maintaining the bales in position, with only a parallel safety rail running adjacent to prevent the bale from jumping off the conveyor chains during transport. With two conveyor chains, it is not necessary to engage the bales with hooks or lugs, as the bales are resting on the conveyor chains and so move when it moves. The load engaging faces of these conveyor chains comprise metal that does not provide appreciable friction between the face and the bale.

Such a bale trailer is illustrated in the laid open Canadian Patent application 2,300,006 of Rempel.

The difference in the two types of conveyor chains is evident when unloading the bales. Typically it is desired to store the bales on the ground pushed tightly together end-to-end. To accomplish this, the new load of bales is positioned with the load bed tilted and the rear end near the ground such that a row of bales on the trailer is in end-to-end alignment with the bales on the ground. The conveyor chain is operated to carry the bales rearward and off the trailer as the trailer moves ahead. Where the conveyor chain includes hooks, considerable force can be exerted to push the bales together, however if the speed of the trailer forward is not synchronized with the speed of the conveyor chain rearward problems occur. If too fast, the bales are not pushed together, while if too slow, the hooks on the conveyor chain move rearward through the strings and bale, causing damage, since the bales are essentially obstructed relative to the conveyor chain. Where possible on level ground in good conditions, the tow vehicle is simply put in neutral and the conveyor chain is operated to push the bales off and at the same time, as the bales push together the trailer is pushed forward, effectively synchronizing the speeds.

With a double conveyor chain with no hooks, there is very little friction and the conveyor chain simply slides under the bales if there is any resistance. Such an apparatus is unable to push the bales closely together for storage.

Conveyor chains are expensive and require maintenance and adjustment. It would be an advantage to provide a bale trailer with only one conveyor chain for each row of bales, as in Pfremmer and Honomichl, Sr. wherein the conveyor chain was configured to reduce damage to the bales, and yet could provide some force to push the bales together for storage on the ground.

SUMMARY OF THE INVENTION

It is an object of the present invention to provide a trailer for transporting cylindrical bales of the type wherein the bales are supported on a single conveyor chain located between two rails for maintaining the bales in position on the conveyor chain, and wherein the load engaging face of the conveyor chain is configured such that damage to bales is reduced.

It is a further object of the present invention to provide such a trailer wherein the conveyor chain includes a load engaging face comprising resilient pads that frictionally engage the surface of the bales without protruding into the bales, thereby allowing the load engaging face to slide under the bale when movement of the bale is obstructed.

It is a further object of the present invention to provide a trailer for loading and transporting cylindrical bales that loads and carries three rows of bales by positioning a third row on top of a pair of side-by-side rows.

The present invention provides, in one aspect, a trailer for transporting cylindrical bales comprising a frame, and a hitch attached to a front end of the frame and adapted for attachment to a towing vehicle for movement in an operating travel direction. A conveyor chain is operatively mounted on the frame and oriented substantially parallel to the operating travel direction, and means are provided to support and maintain a plurality of bales on a top load engaging face of the conveyor chain as the top load engaging face of the conveyor chain moves rearward. The load engaging face of the conveyor chain includes means to create a high friction interface between the load engaging face and an outer surface of each bale substantially without protruding into the bale such that the bales move rearward with the load engaging face of the conveyor chain unless obstructed, and such that the load engaging face can slide with respect to the bales when movement of the bales is obstructed.

The present invention provides, in a second aspect, a trailer for transporting cylindrical bales comprising a frame, and a hitch attached to a front end of the frame and adapted for attachment to a towing vehicle for movement in an operating travel direction. A pair of substantially parallel rails is attached to the frame and substantially aligned with the operating travel direction. A conveyor chain is oriented parallel to the rails and located between and below the rails such that a bale can rest on a top load engaging face of the conveyor chain and be maintained in position by the rails, wherein the top load engaging face of the conveyor chain moves rearward and carries bales resting thereon rearward. The load engaging face of the conveyor chain comprises a plurality of resilient pads having a roughened surface to increase friction between the pads and an outer surface of the bale without protruding into the bale such that the load engaging face of the conveyor chain can slide with respect to the bale when movement of the bale is obstructed.

The present invention provides, in a third aspect, trailer for loading and transporting cylindrical bales comprising a frame, and a hitch attached to a front end of the frame and adapted for attachment to a towing vehicle for movement in an operating travel direction. First and second conveyors are oriented longitudinally along respective first and second sides of the frame such that a cylindrical bale can rest on each conveyor. A first loading arm is operative to raise a first bale from the ground and position the first bale on the first conveyor, and a second loading arm is operative to raise a second bale from the ground and position the second bale on the second conveyor beside the first bale. A third loading arm is operative to raise the first bale from the first conveyor to a height sufficient to allow the first loading arm to raise a third bale from the ground and position the third bale on the first conveyor, and the third loading arm is further operative to lower the first bale to rest on the second and third bales. The first and second conveyors move substantially in unison to move the first, second, and third bales along the frame.

The trailer of the invention is more economical to manufacture and maintain than present trailers requiring two conveyor chain under each row of bales, and much reduces damage to bales since the bales are carried by friction with nothing protruding into the body of the bale that can tear the bale if its movement is obstructed. The friction force moving the bales rearward also provides a considerable force during unloading to push the bales together for storage on the ground, while reducing damage to the bales.

The trailer of the invention also provides a self-loading trailer with high capacity, carrying three rows of bales rather than two rows as in the prior art self-loading trailers.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
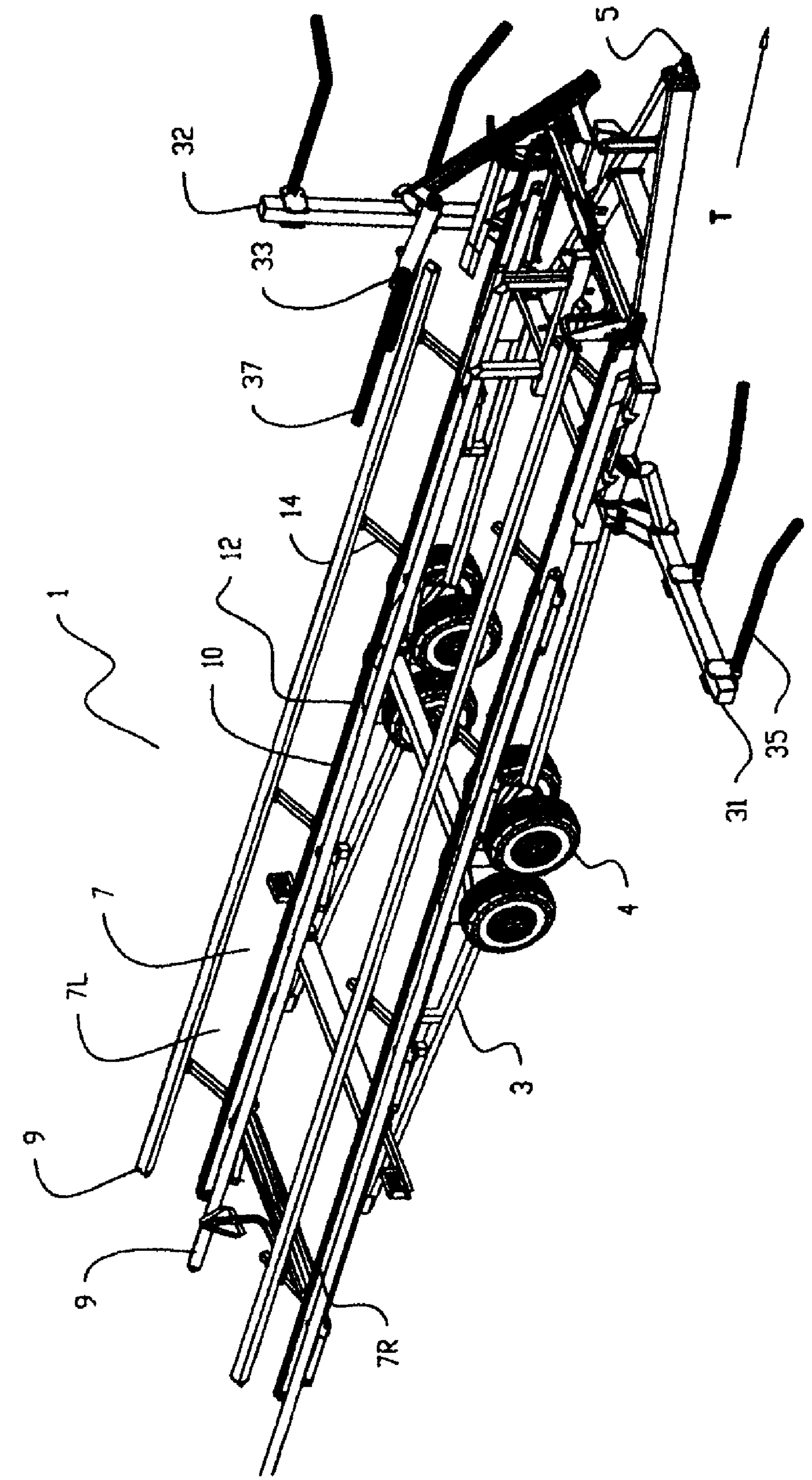
FIG. 1 is a perspective view of an embodiment of the bale trailer.

FIGS. 1, 4, 5, and 6 illustrate a trailer 1 for transporting cylindrical bales. The trailer 1 comprises a frame 3, and a hitch 5 attached to a front end of the frame 3 and adapted for attachment to a towing vehicle for movement in an operating travel direction T on the wheels 4 supporting the frame 3. Right and left conveyors 7R, 7L are oriented longitudinally along respective first and second sides of the frame 3 such that a cylindrical bale can rest on each conveyor 7. Bales are oriented on the conveyors 7 such that a longitudinal axis of the cylindrical bales is substantially aligned with the operating travel direction T, as seen in the front view of FIG. 4.

Figure 2:
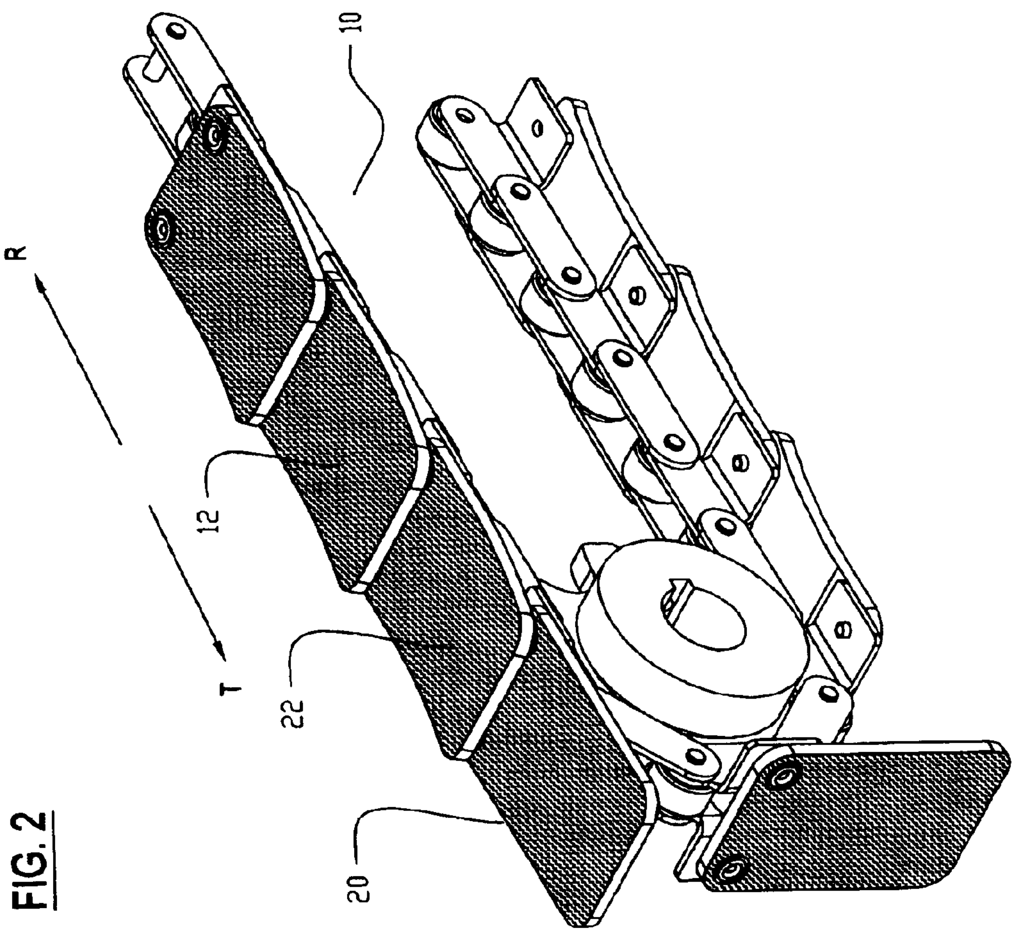
FIG. 2 is a perspective view of the conveyor chain.
Figure 3:
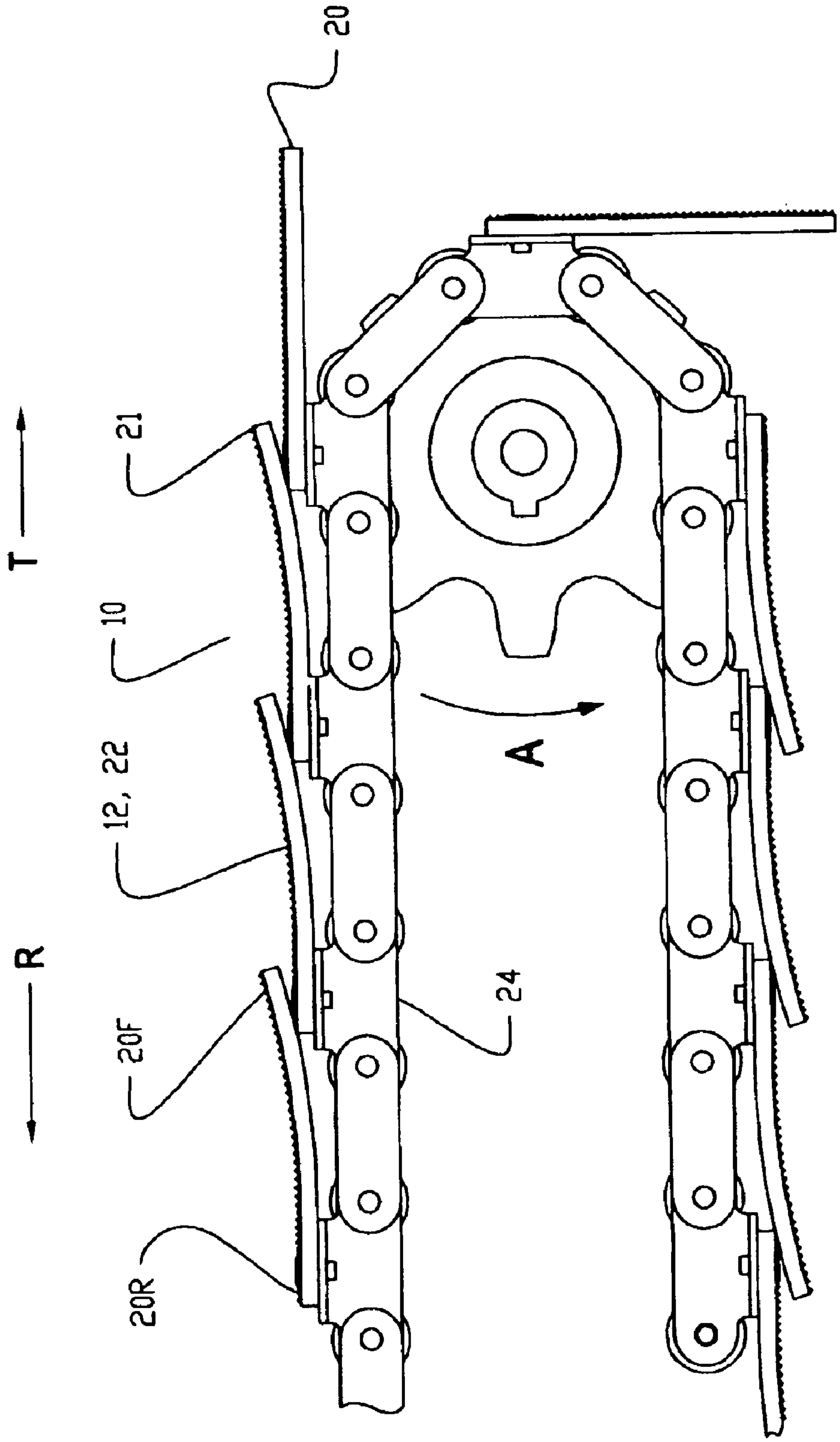
FIG. 3 is a side view of the conveyor chain.

The conveyors 7 comprise a pair of substantially parallel conveyor rails 9 attached to the frame 3 and substantially aligned with the operating travel direction T and a conveyor chain 10 oriented parallel to the rails 9 and located between and below the rails 9 such that a bale can rest on a top load engaging face 12 of the conveyor chain 10 and be maintained in position by the rails 9. The distance between the rails 9 on each conveyor 7 can be adjusted by sliding same along rail brackets 14, or by varying the angle of the rail brackets 14 with respect to the frame 3. This adjustment allows bales of varying diameters to be carried. The rails 9 are adjusted so the weight of the bales rests on the load engaging face 12 of the conveyor chain 10, and the rails 9 act to maintain the bale in position on the load engaging face 12. With the majority of the weight on the load engaging face 12, friction between the load engaging face 12 and the surface of the bale is maximized, and friction between the bale and the rails 9 is minimized so the bale moves with the load engaging face 12, and slides on the rails 9. The rails 9 support and maintain the bales on the top load engaging face 12 as it moves rearward As illustrated in FIGS. 2 and 3, the load engaging face 12 of the conveyor chain 10 comprises a plurality of resilient pads 20 having a roughened surface 22 to increase friction between the pads 20 and an outer surface of the bale without protruding into the bale. The load engaging face 12 will not damage a bale when it is loaded, and the load engaging face 12 can slide with respect to the bale when movement of the bale is obstructed, as sometimes occurs. Where the load engaging face protrudes into the bale, as with the hooks and pins of the prior art, when the bale is obstructed the hooks tear the twine tying the bales, such that the bales can then fall apart when unloaded. The roughened resilient pads 20 create a high friction interface between the load engaging face 12 and an outer surface of each bale. The friction combined with the fact that the majority of the bale's weight is carried on the load engaging face 12 allows the load engaging face 12 to exert the required force on the bales to move them rearward.

As best seen in FIG. 3, the load engaging face 12 of the conveyor chain 10 comprises resilient pads 20 attached to the conveyor chain 10 adjacent to each other. Each resilient pad 20 is attached at a rear end 20R thereof to a link 24 of the conveyor chain 10. The front end 20F of each resilient pad 20 rests on top of the rear end 20R of the adjacent resilient pad 20. This arrangement cups the resilient pad 20 somewhat, and provides a series of raised edges 21 that increase the drag between the surface of the bale and the load engaging face 12. The resilient pads 20 illustrated are flexible rubber about three inches wide which have been found to provide satisfactory operation. The illustrated embodiment is configured so that the drive sprocket 26 rotates in direction A and the load engaging face 12 moves rearward in direction R, opposite to the operating travel direction T. The bales are loaded on the front end of the trailer 1, and are moved progressively rearward until the trailer 1 is full.

With the overlapping resilient pads 20 of FIG. 3. moving rearward in direction R, the pads 20 can slide relative to the bale without catching on the strings tying the bale, or the wrapped plant material. The strings and plant material will slide along the surface of one pad 20 then over the raised lip 21 onto the surface 20 of the adjacent pad 20.

Figure 3A:
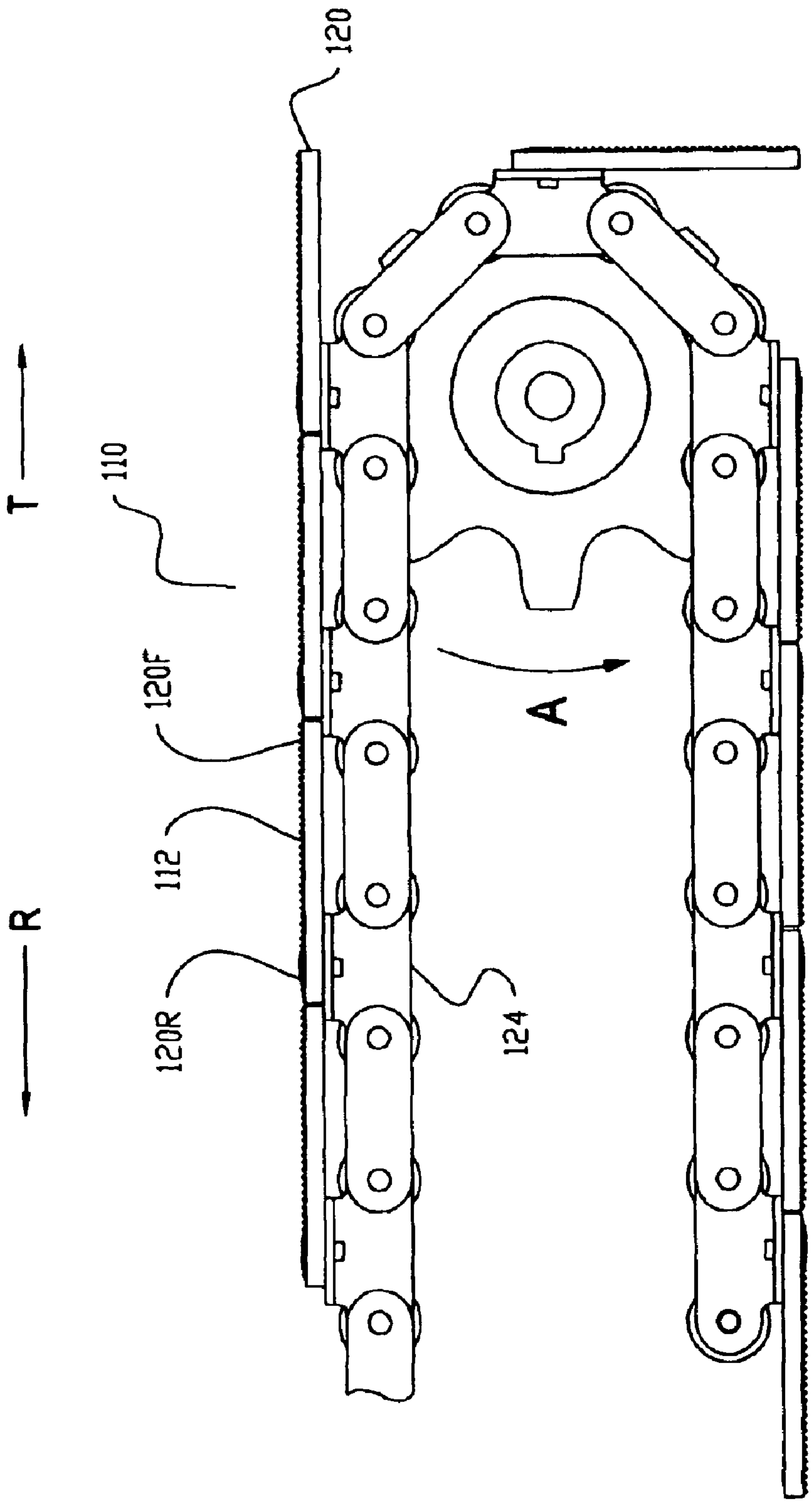
FIG. 3A is a side view of an alternate conveyor chain.

FIG. 3A illustrates an alternate embodiment of the conveyor chain 110 wherein the resilient pads 120 are attached to the conveyor chain 110 adjacent to each other. Each resilient pad 120 is attached at a rear end 120R thereof to a link 124 of the conveyor chain 110. The front end 120F of each resilient pad 120 lies flat adjacent to the rear end 120R of the adjacent resilient pad 120. The load engaging face 112 comprises a substantially flat surface which could provide satisfactory service in some conditions.

Figure 3B:
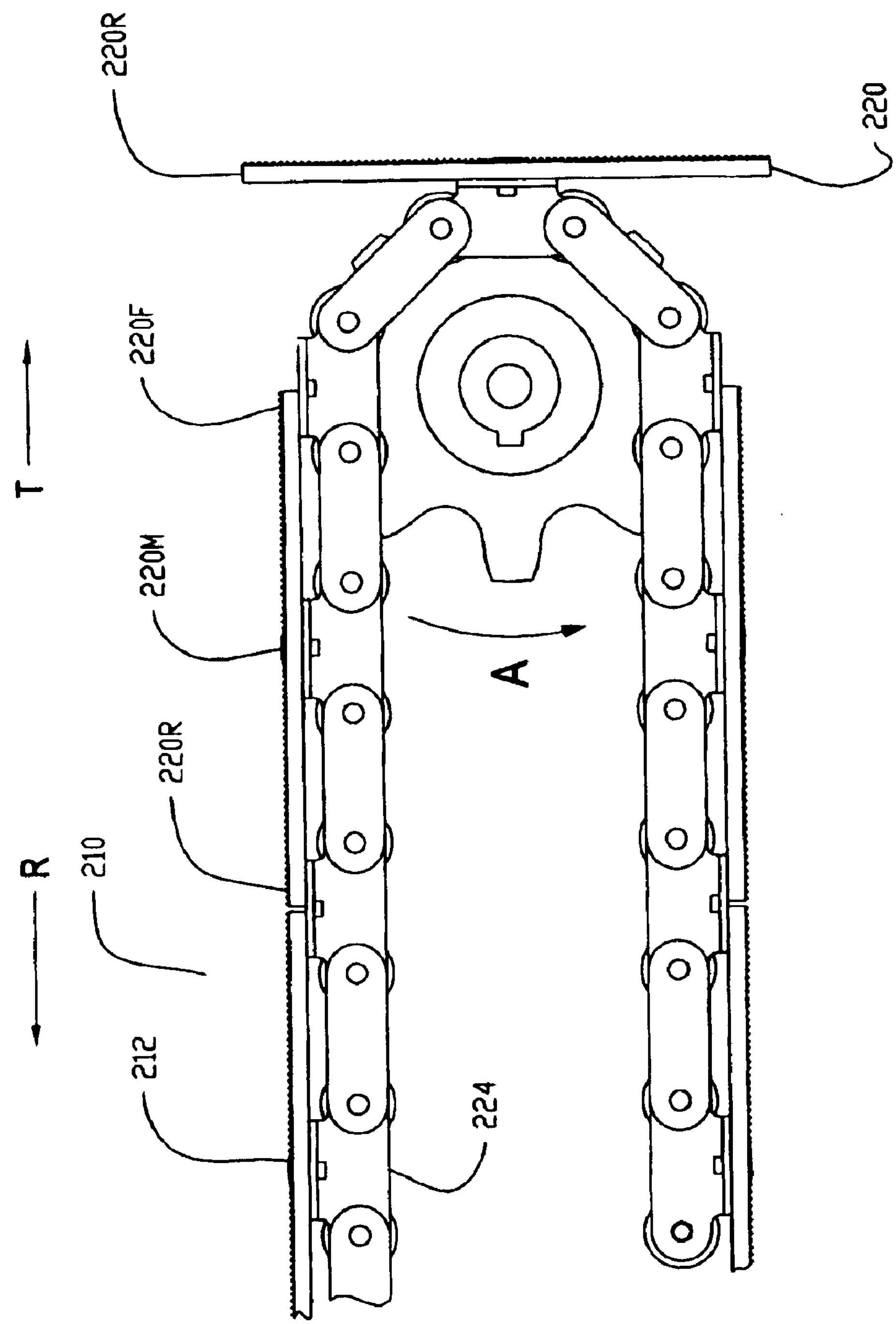
FIG. 3B is a side view of a different alternate conveyor chain.

Similarly, FIG. 3B illustrates another possible alternate embodiment of the conveyor chain 210 wherein the resilient pads 220 are attached to the conveyor chain 210 adjacent to each other. Each resilient pad 220 is attached at a mid-point 220M thereof to a link 224 of the conveyor chain. 210. The front and rear ends 220F, 220R of each resilient pad 220 lie flat adjacent to corresponding front and rear ends 220F, 220R of the adjacent resilient pad 220. The load engaging face 212 again comprises a substantially flat surface which could provide satisfactory service in some conditions. Problems can occur with catching of the rear end 220R as it goes around the sprocket in a raised position as seen in FIG. 3B.

The trailer is self-loading such that same can be taken into the field to pick up the bales and transport same without a second pick-up vehicle to deposit the bales on the trailer 1.

A first loading arm 31 is mounted at the right front end of the frame 3 and is operative to raise a first bale B1 from the ground and position it on the right conveyor 7R. A second loading arm 32 is mounted at the left front end of the frame 3 and is operative to raise a second bale B2 from the ground and position it on the left conveyor 7L beside the first bale B1.

The first and second loading arms 31, 32 each comprise a pair of spaced apart prongs 35 extending forward from the loading arm 31, 32 such that the prongs 35 can be positioned adjacent to the ground, as in FIG. 1, to engage opposite sides of a bale resting on the ground as the trailer 1 moves forward. The prongs 35 are bent so as to taper outwards at their ends. This allows the bales to be engaged somewhat out of alignment and be forced into alignment by the bent prongs 35.

Figure 4:
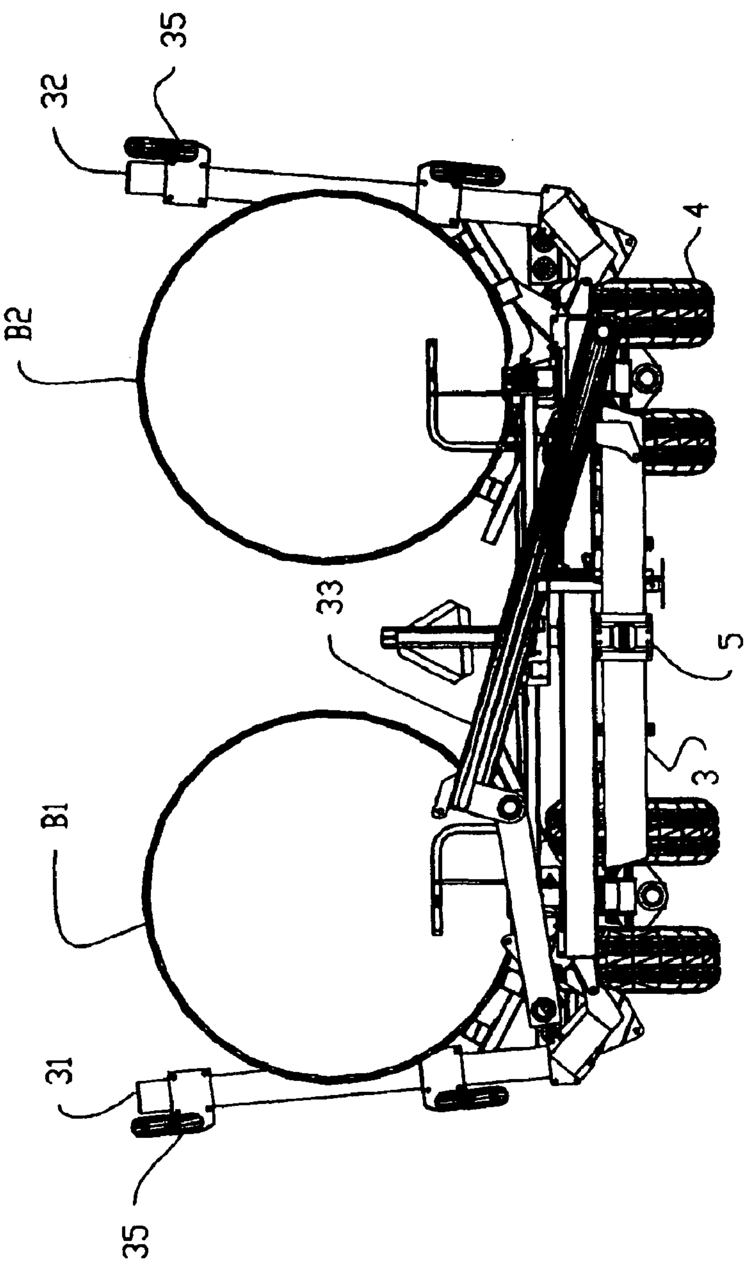
FIG. 4 is a front view of the embodiment of the trailer with first and second bales loaded.

A third loading arm 33 is pivotally attached to the front end of the frame 3 on the left side of the frame 3 opposite to the first loading arm 31. The third loading arm 33 comprises a pair of spaced apart prongs 37 extending rearward from the third loading arm 33 such that when the first bale B1 is resting on the right conveyor 7R after being positioned by the first loading arm 31, the prongs 37 on the third loading arm 33 extend rearward under opposite sides of the first bale B1, as illustrated in FIG. 4.

Figure 5:
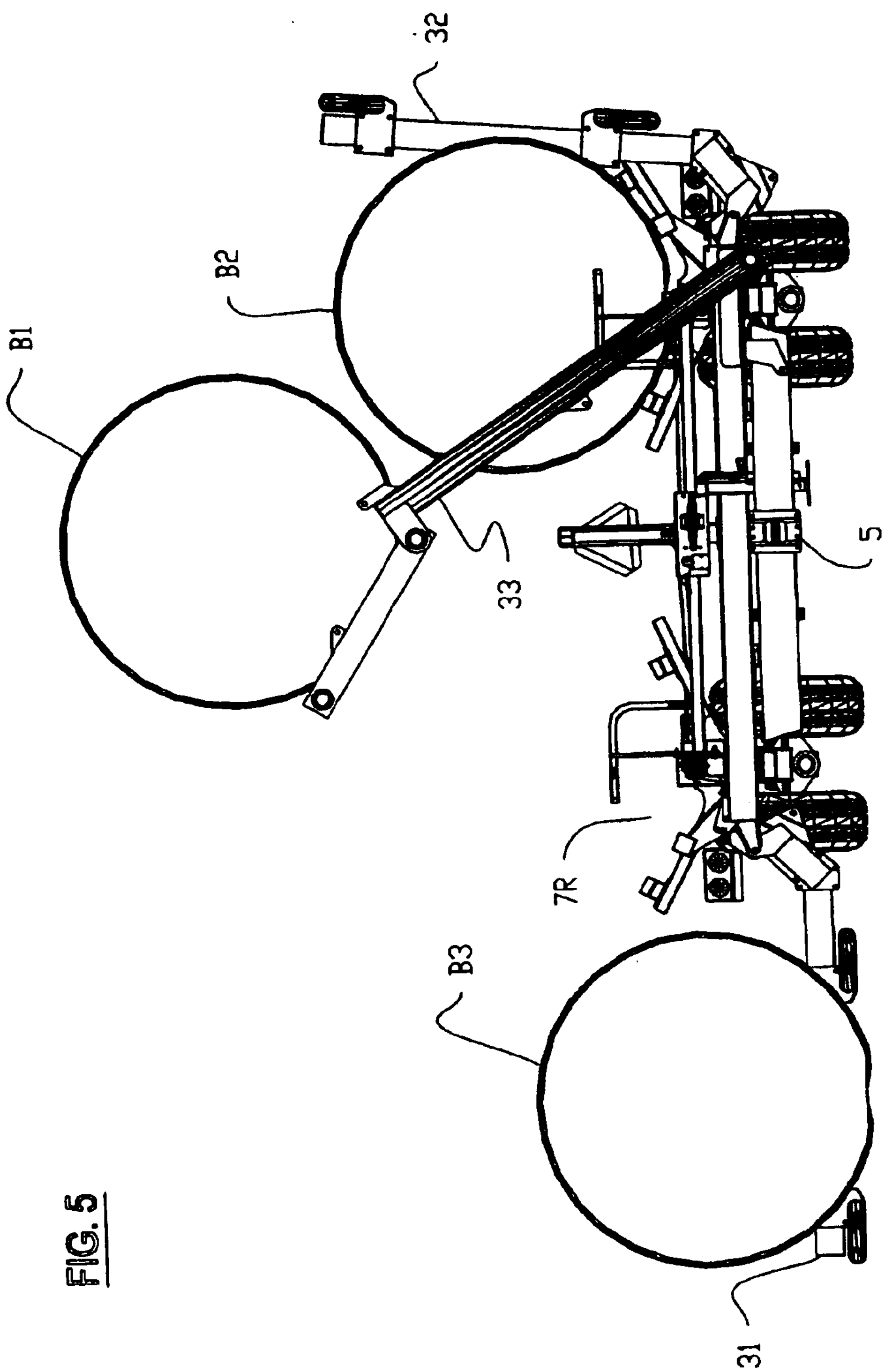
FIG. 5 is a front view of the embodiment of the trailer with first bale raised to allow the third bale to be loaded.
Figure 6:
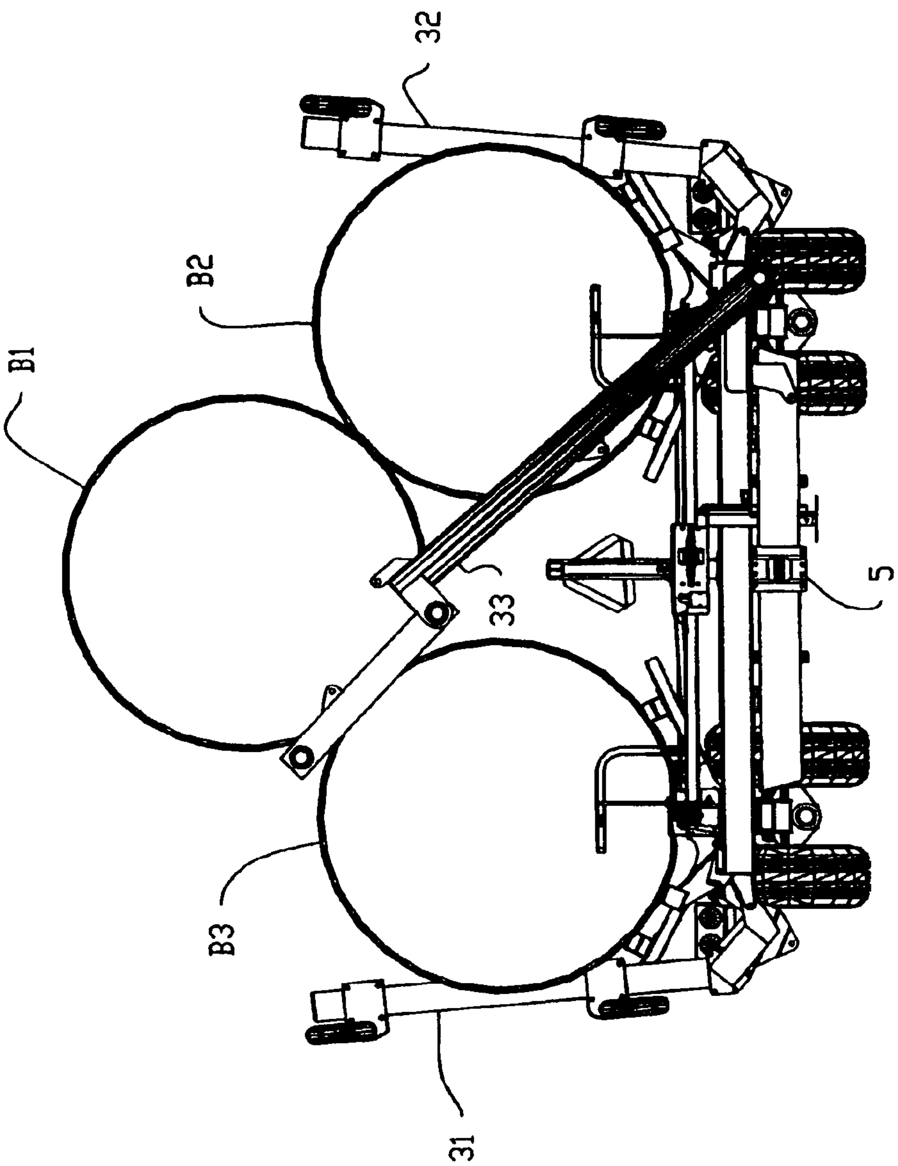
FIG. 6 is a front view of the embodiment of the trailer with first, second, and third bales loaded.

As illustrated in FIG. 5, the third loading arm 33 raises the first bale B1 on rear ward extending prongs 37 from the right conveyor 7R to a height sufficient to allow the first loading arm 31 to raise a third bale B3 from the ground and position it on the right conveyor 7R. Once the third bale B3 is in position, the third loading arm 33 is lowered to lower the first bale B1 to rest on the second and third bales B2, B3, as illustrated in FIG. 6. The bales B1, B2, B3 are positioned by the loading arms 31, 32, 33 at front ends of the conveyors 7R, 7L. When bale B3 has been loaded, the right and left conveyors 7R, 7L move rearward in unison to move the bales B1, B2, B3 rearward along the frame 3. When the bales B1, B2, B3 are moved rearward, the third loading arm 33 is lowered into position on the right conveyor 7R so that the process can be repeated and three more bales can be positioned in a like manner. When the trailer 1 is filled, the bales are transported to the desired location, most commonly the frame is tilted up at the front end, and the conveyors 7R, 7L are operated to move the bales rearward off the trailer 1. The frictional interface between the load engaging face 12 and the bale surface allows a considerable force to be exerted to push the bales tightly against one another for storage on the ground.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A trailer for transporting cylindrical bales, the trailer comprising:

a frame, and a hitch attached to a front end of the frame and adapted for attachment to a towing vehicle for movement in an operating travel direction;

a conveyor chain operatively mounted on the frame and oriented substantially parallel to the operating travel direction;

means to support and maintain a plurality of bales on a top load engaging face of the conveyor chain as the top load engaging face of the conveyor chain moves rearward;

wherein the load engaging face of the conveyor chain includes means to create a high friction interface between the load engaging face and an outer surface of each bale substantially without protruding into the bale such that the bales move rearward with the load engaging face of the conveyor chain unless obstructed, and such that the load engaging face can slide with respect to the bales when movement of the bales is obstructed.

2. The trailer of claim 1 wherein the means to support and maintain a plurality of bales comprises a rail oriented parallel to the conveyor chain above and on each side of the conveyor chain.

3. The trailer of claim 1 wherein the means to create a high friction interface between the load engaging face and an outer surface of each bale comprises a plurality of resilient pads having a roughened surface.

4. The trailer of claim 3 wherein the load engaging face of the conveyor chain comprises at least two resilient pads attached to the conveyor chain adjacent to each other, and wherein each resilient pad is attached at a rear end thereof to a link of the conveyor chain, and wherein a front end of one resilient pad rests on top of the rear end of an adjacent resilient pad.

5. A trailer for transporting cylindrical bales, the trailer comprising:

a frame, and a hitch attached to a front end of the frame and adapted for attachment to a towing vehicle for movement in an operating travel direction;

a pair of substantially parallel rails attached to the frame and substantially aligned with the operating travel direction;

a conveyor chain oriented parallel to the rails and located between and below the rails such that a bale can rest on a top load engaging face of the conveyor chain and be maintained in position by the rails, wherein the top load engaging face of the conveyor chain moves rearward and carries bales resting thereon rearward;

wherein the load engaging face of the conveyor chain comprises a plurality of resilient pads having a roughened surface to increase friction between the pads and an outer surface of the bale substantially without protruding into the bale such that the load engaging face of the conveyor chain can slide with respect to the bale when movement of the bale is obstructed.

6. The trailer of claim 5 wherein bales are oriented such that cylindrical axes thereof are substantially aligned with the rails.

7. The trailer of claim 5 wherein a distance between the rails is adjustable.

8. The trailer of claim 5 wherein the load engaging face of the conveyor chain comprises at least two resilient pads attached to the conveyor chain adjacent to each other, and wherein each resilient pad is attached at a rear end thereof to a link of the conveyor chain, and wherein a front end of one resilient pad rests on top of the rear end of an adjacent resilient pad.

9. The trailer of claim 8 wherein resilient pads are attached along the entire length of the conveyor chain adjacent to each other, and wherein each resilient pad is attached at a rear end thereof to a link of the conveyor chain, and wherein a front end of one resilient pad rests on top of the rear end of an adjacent resilient pad.

10. The trailer of claim 5 wherein the resilient pads are at least three inches wide.

11. The trailer of claim 5 wherein the resilient pads are rubber pads.

12. A trailer for loading and transporting cylindrical bales, the trailer comprising:

a frame, and a hitch attached to a front end of the frame and adapted for attachment to a towing vehicle for movement in an operating travel direction;

first and second conveyors oriented longitudinally along respective first and second sides of the frame such that a cylindrical bale can rest on each conveyor;

a first loading arm operative to raise a first bale from the ground and position the first bale on the first conveyor;

a second loading arm operative to raise a second bale from the ground and position the second bale on the second conveyor beside the first bale;

a third loading arm operative to raise the first bale from the first conveyor to a height sufficient to allow the first loading arm to raise a third bale from the ground and position the third bale on the first conveyor, the third loading arm further operative to lower the first bale to rest on the second and third bales;

wherein the first and second conveyors move substantially in unison to move the first, second, and third bales along the frame.

13. The trailer of claim 12 wherein bales are oriented on the conveyors such that a longitudinal axis of the bales is substantially aligned with the operating travel direction.

14. The trailer of claim 12 wherein the first, second, and third loading arms are located in proximity to the front end of the frame such that the first, second, and third bales are positioned by the loading arms at front ends of the first and second conveyors, and wherein the conveyors move the bales rearward.

15. The trailer of claim 14 wherein at least one of the first and second loading arms comprises a pair of spaced apart prongs extending forward from the loading arm such that the prongs can be positioned adjacent to the ground to engage opposite sides of a bale resting on the ground as the trailer moves forward.

16. The trailer of claim 14 wherein the third loading arm comprises a pair of spaced apart prongs extending rearward from the third loading arm such that when the first bale is resting on the first conveyor after being positioned by the first loading arm, the prongs on the third loading arm extend rearward under opposite sides of the first bale.

17. The trailer of claim 16 wherein the third loading arm is pivotally attached to the front end of the frame adjacent to a side of the frame opposite to the first loading arm.

18. The trailer of claim 12 wherein at least one of the first and second conveyors comprises a pair of substantially parallel conveyor rails attached to the frame and substantially aligned with the operating travel direction, and a conveyor chain oriented parallel to the rails and located between and below the rails such that a bale can rest on a top load engaging face of the conveyor chain and is maintained in position by the rails, and such that as the top load engaging face of the conveyor chain moves, the bale moves rearward.

19. The trailer of claim 18 wherein the load engaging face of the at least one conveyor chain comprises a plurality of resilient pads having a roughened surface to increase friction between the pads and an outer surface of the bale substantially without protruding into the bale such that the load engaging face of the conveyor chain can slide with respect to the bale when movement of the bale is obstructed.

20. The trailer of claim 19 wherein the load engaging face of the at least one conveyor chain comprises at least two resilient pads attached to the conveyor chain adjacent to each other, and wherein each resilient pad is attached at a rear end thereof to a link of the conveyor chain, and wherein a front end of one resilient pad rests on top of the rear end of an adjacent resilient pad.

* * * * *